(No Model.)

L. D. SMITH.
Stock Car.

No. 232,770.  Patented Sept. 28, 1880.

UNITED STATES PATENT OFFICE.

LORENZO D. SMITH, OF SANDWICH, ILLINOIS, ASSIGNOR OF ONE-HALF OF HIS RIGHT TO GEORGE A. SMITH, OF SAME PLACE.

STOCK-CAR.

SPECIFICATION forming part of Letters Patent No. 232,770, dated September 28, 1880.

Application filed June 22, 1880. (No model.)

*To all whom it may concern:*

Be it known that I, LORENZO D. SMITH, of Sandwich, in the county of De Kalb, and in the State of Illinois, have invented certain new and useful Improvements in Stock-Cars; and I do hereby declare that the following is a full, clear, and exact description thereof, reference being had to the accompanying drawings, and to the letters of reference marked thereon, making a part of this specification.

My invention relates particularly to stock-cars; and it consists in the construction and arrangement of a device intended for preventing the cattle from getting down, but keeping them on their feet, as will be hereinafter more fully set forth.

In order to enable others skilled in the art to which my invention appertains to make and use the same, I will now proceed to describe its construction and operation, referring to the annexed drawings, in which—

Figure 1:
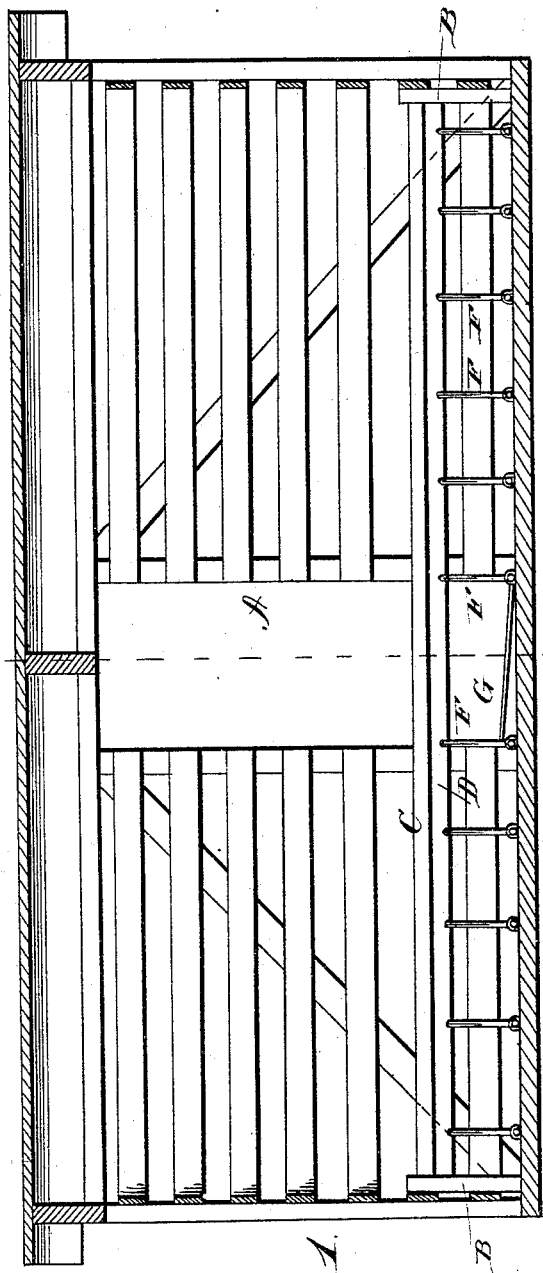
Figure 2:
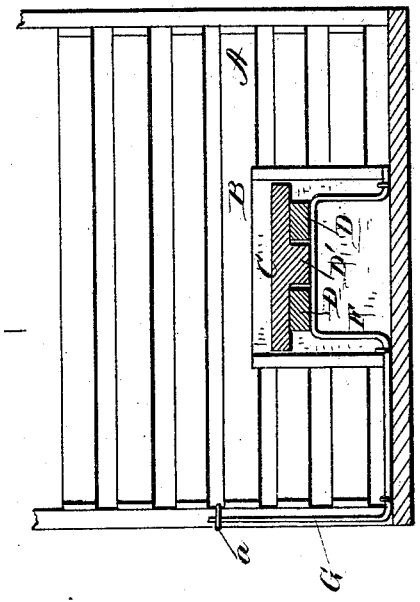

Figure 1 is a longitudinal vertical section of a stock-car embodying my invention. Fig. 2 is a transverse vertical section of the same.

A represents the body or box of a stock-car constructed in any of the known and usual ways.

The body A is at each end provided with a vertical guide, B, extending from the bottom upward for a suitable distance. In these guides B B is placed a narrow platform, C, extending the entire length of the car, and supported upon two bars, D D, and these bars are connected to and operated by a series of cranks or stirrups, F F, pivoted to the bottom of the car.

The platform C is on its under side provided with a central bar, D′, which fits between the two bars D D and thus keeps the platform steady.

One of the cranks or stirrups is extended on one side and forms a lever, G, for operating the same. Another stirrup is extended on the opposite side in like manner, so that the platform can be operated from either side of the car. By means of one of the levers G the cranks or stirrups can be turned down or raised up, as required, for lowering or raising the platform. When the platform is raised suitable catches, *a*, hold the levers G in place.

This device is intended for the purpose of keeping cattle from getting down in the car, and keeping them on their feet.

This device can be put into any car, and merchandise and lumber can be loaded without removing the device.

It will be noticed that in my invention the platform itself moves in a vertical plane, while the supporting-bars move on an arc of a circle; hence the platform will not injure the cattle in any way while being raised or lowered, which would be the case if the platform were moved in the same manner as the supporting-bars—that is, on the arc of a circle.

Having thus fully described my invention, what I claim as new, and desire to secure by Letters Patent, is—

1. The combination, with a car, of the platform C, bars D D, cranks or stirrups F, and one or more levers, G, substantially as and for the purposes herein set forth.

2. The combination, with a car, of the vertical guides B B, platform C, bars D D and D′, cranks or stirrups F, and one or more levers, G, substantially as and for the purposes herein set forth.

In testimony that I claim the foregoing I have hereunto set my hand this 14th day of June, 1880.

LORENZO D. SMITH.

Witnesses:
E. S. JOHNSON,
G. W. DAVIS.